No. 866,279. PATENTED SEPT. 17, 1907.
W. W. JENKINS.
NUT LOCK.
APPLICATION FILED JUNE 26, 1907.
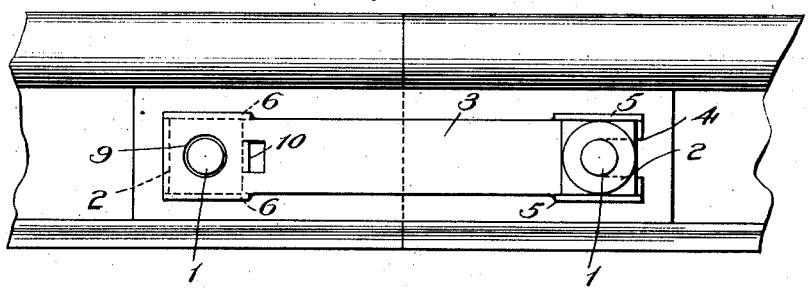
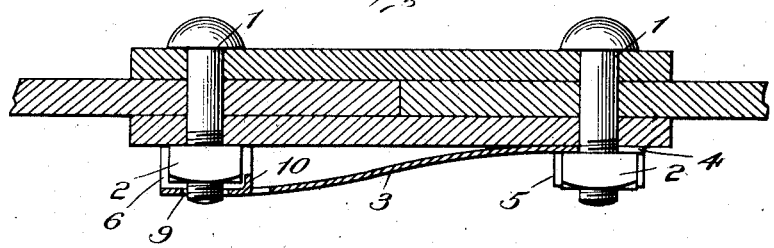
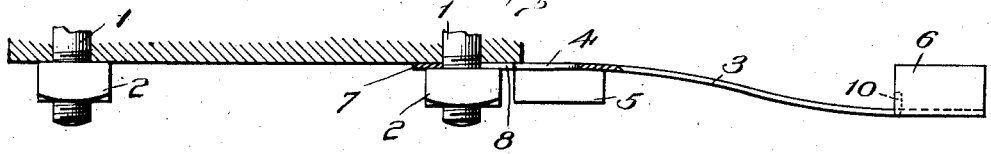
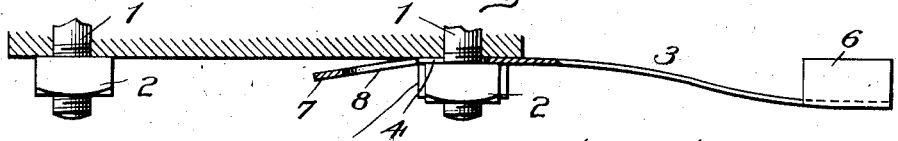
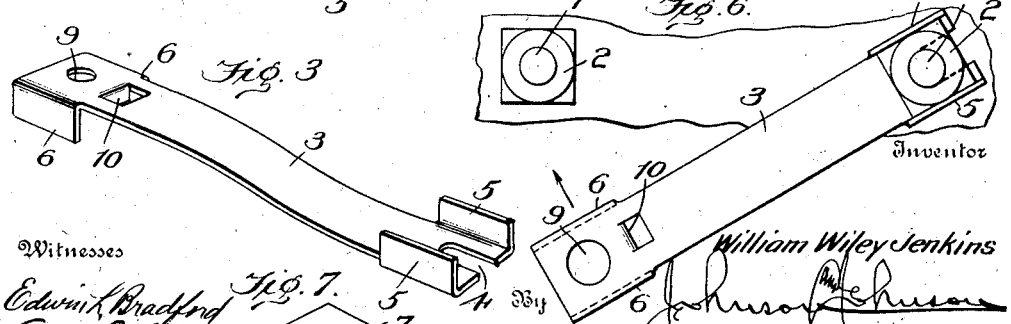

UNITED STATES PATENT OFFICE.

WILLIAM WILEY JENKINS, OF LISMAN, KENTUCKY.

NUT-LOCK.

No. 866,279.  Specification of Letters Patent.  Patented Sept. 17, 1907.

Application filed June 26, 1907. Serial No. 380,895.

*To all whom it may concern:*

Be it known that I, WILLIAM WILEY JENKINS, a citizen of the United States, residing at Lisman, in the county of Webster and State of Kentucky, have invented certain new and useful Improvements in Nut-Locks; and I do hereby declare the following to be a full, clear, and exact description of the invention, such as will enable others skilled in the art to which it appertains to make and use the same.

My invention relates to that type of nut-locks in which a plate is arranged to span the bolts and has locking means to engage the sides of the nut, and my improvement resides in a novel construction of spring-plate adapted to span and in connection with a gage-plate to lock the nuts on a pair of bolts and in the claim appended hereto I will point out the parts and combination of parts wherein my invention resides in connection with the accompanying drawing in which,—

Figure 1 shows in side view the ends of two joined rails and a pair of fish-plate bolts the nuts whereof are locked by my improved side locking spring plate. Fig. 2 is a horizontal section of the same taken through the locking spring-plate. Fig. 3 shows the nut locking spring-plate. Fig. 4 shows in horizontal section a part of the fish-plate and its nutted bolts, the nut of one bolt having been partially tightened upon a removable forked gage-plate and the slotted end of the locking spring-plate in position to drive the gage-plate from beneath the nut and in doing so to embrace the nut by said slotted end. Fig. 5 is a like view the spring plate being shown as having by its slotted end pushed the gage-plate from beneath the nut and embraced it and in position to be turned edgewise with the nut a half revolution to tighten the nut on the bolt and to bring the other end of the spring-plate in engagement with the other nut to engage the spring-plate in locking position as in Figs. 1 and 6. Fig. 6 shows the pair of nutted bolts and the spring locking plate in position while being turned as the means of tightening one nut in moving to its locking engagement with the other nut. Fig. 7 shows the slotted gage-plate on which one of the nuts is first partially tightened against the fish-plate, and is then removed by the act of engaging the slotted end of the spring-plate with the nut.

The usual rail-joint fish-plates are secured to the rails by a pair of bolts 1—1, and for locking the nuts 2, on the bolts I have designed an improved locking plate 3, preferably of spring steel having at one end a slot 4, open at the end and adapted to receive the shank of the bolt. This slotted end has an outward upset flange or lip 5—5 at each edge adapted to receive the nut to form side locks thereto as in Figs. 1—3— and 6. The other end of the spring-plate has edge flanges or lips 6—6, upset inward adapted to receive the other nut and form side locks thereto, so that at its slotted end the spring-plate is clamped against the fish-plate by the nut, while the other end of the spring-plate is sprung over and by its upset flanges or lips locks the nut and is maintained in such locking position by the spring function of the plate causing it to exert pressure upon the nut or against the fish-plate, the clamped end of the spring being fixed to the fish-plate by the nut as in Fig. 2. While the locking function of the plate is made by its reversely upset flanges or lips embracing the nuts, obviously the flanges or lips at the slotted end of the spring-plate renders it impracticable to drive the nut home to clamp the spring-plate upon the fish-plate because the nut cannot be turned on the bolt between the upset flanges or lips of the locking-plate.

My invention therefore comprises means by which the flanged slotted end of the spring-plate can be engaged with the bolt and the nut and then serve as a wrench for turning the nut to tighten it and for this purpose I provide a removable gage-plate 7, about the thickness of the spring-plate and having a slot 8, open at the end adapted with its slotted end outward to be slid on the fish-plate under the nut over the bolt as in Fig. 4. Upon this gage-plate the nut is partially driven home upon the bolt, that is, the nut is not driven tightly upon the gage plate so that it may be pushed out from beneath the nut as in Fig. 5. For this purpose the slotted end of the spring-plate is first set in abutting relation to the slotted end of the gage-plate and by pushing the former forces the gage-plate out from beneath the nut so that the slotted end of the spring locking-plate will then take the place of the gage-plate and the nut embraced by the side flanges of the locking-plate as in Fig. 5. In this position the spring-plate will stand away from the end of and in alinement with the fish-plate so that in turning or swinging the spring-plate around in the direction of the arrow Fig. 6 upon the bolt as a pivot the flanges or lips embracing the nut will act as a wrench and cause the nut to be turned a half revolution bringing thereby the other flanged or lipped end of the spring-plate in position to be pulled out from the fish-plate and sprung over the face of the other nut as in Fig. 2. This turning or swing of the locking plate effects the tightening of the nut on the bolt on which the plate is turned or swung as a pivot and it is from this pivot point that the spring has its resilient function to allow the plate to be sprung over and upon the nut. This resilient end of the spring-plate has a hole 9, to receive the projecting end of the bolt and while thus allowing the spring end of the plate to be clamped over the nut, the plate is thereby prevented from longitudinal movement which might cause its slotted end to work out from beneath the nut by the jarring and creeping action of the rails. For this purpose a lip 10, may be upset from the locking-plate so as to engage the nut as in Fig. 2, but the resilient force and the curved form of the spring-plate caused by springing it over the nut, will constantly tend to hold it in place.

I claim:

1. For railway rail splices, a nut-lock, comprising a spring-plate adapted to span the nuts and having a slot at one end open at its end and flanges or lips upset outwardly, to embrace and form side locks for the nut and be clamped by it upon the fish-plate, the other end of the spring-plate having flanges or lips upset inwardly to embrace and form side locks for the other nut and adapted to be sprung over and upon its outer face.

2. For railway rail splices, a nut-lock comprising a spring-plate adapted to span the nuts of the splice-bolts and having a slot at one end open at its end, the said slot being flanked by flanges or lips upset outwardly, the other end of the spring-plate having flanges or lips upset inwardly at its edges.

3. For railway rail splices, a nut-lock comprising a spring-plate adapted to span the nuts of the splice-bolts and having a slot at one end open at its end, the said slot being flanked by flanges or lips, upset outwardly, the other end of the spring-plate having flanges or lips upset inwardly at its edges, and means whereby the slotted end of the spring-plate is caused to effect the clamping action of the nut upon its bolt by rotating the said plate to cause the rotation of said nut to drive it home on the bolt in the operation of locking both nuts.

In testimony whereof I have signed my name to this specification in the presence of two subscribing witnesses.

WILLIAM WILEY JENKINS.

Witnesses:
W. T. BAKER,
W. H. DUNNAGAN.